No. 636,901. Patented Nov. 14, 1899.
J. J. JOHNSON.
ANIMAL TRAP.
(Application filed Aug. 9, 1899.)
(No Model.)

Witnesses
Inventor
J. J. Johnson,
By his Attorneys,
C. A. Snow & Co.

UNITED STATES PATENT OFFICE.

JOSHUA J. JOHNSON, OF ELMVIEW, TEXAS.

ANIMAL-TRAP.

SPECIFICATION forming part of Letters Patent No. 636,901, dated November 14, 1899.

Application filed August 9, 1899. Serial No. 726,702. (No model.)

*To all whom it may concern:*

Be it known that I, JOSHUA J. JOHNSON, a citizen of the United States, residing at Elmview, in the county of Grayson and State of Texas, have invented a new and useful Animal-Trap, of which the following is a specification.

The invention relates to improvements in animal-traps.

The object of the present invention is to improve the construction of animal-traps and to provide a simple, inexpensive, and efficient one designed to be constructed of various sizes and adapted for capturing all kinds of animals attracted by a bait and capable of preventing the captured animal from obtaining access to the bait, so that the latter when alive will not be injured or when otherwise will not be consumed.

The invention consists in the construction and novel combination and arrangement of parts hereinafter fully described, illustrated in the accompanying drawings, and pointed out in the claims hereto appended.

Figure 1:
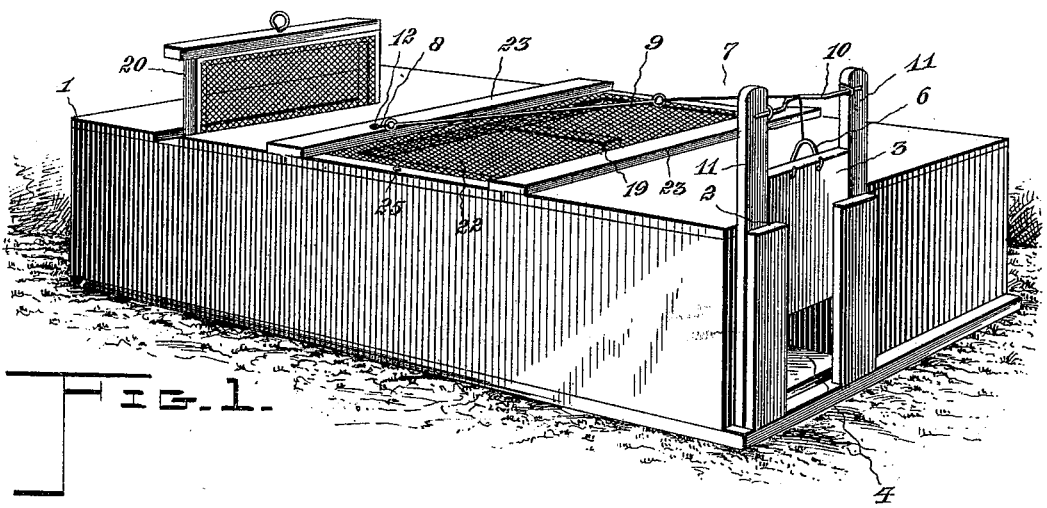
Figure 2:
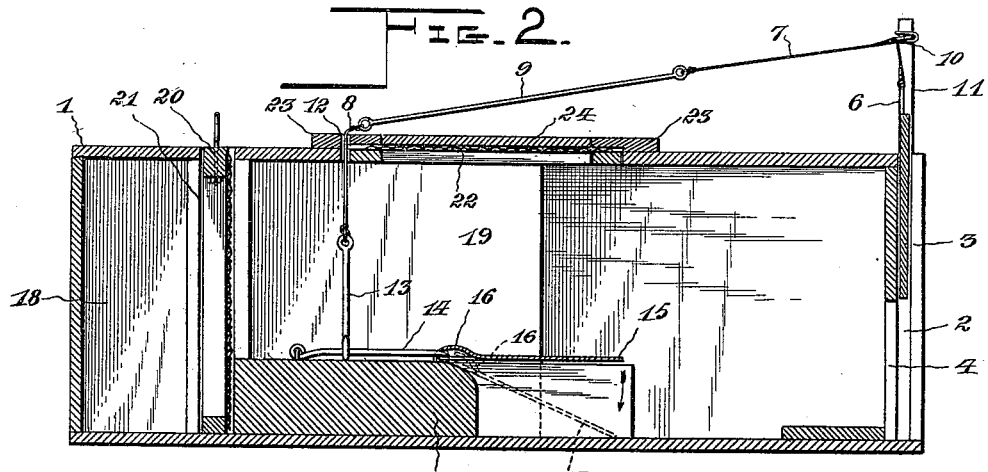
Figure 3:
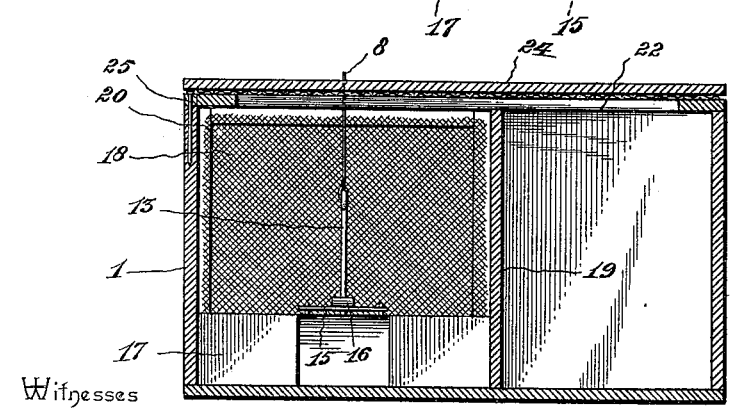

In the drawings, Figure 1 is a perspective view of a trap constructed in accordance with this invention. Fig. 2 is a longitudinal sectional view. Fig. 3 is a transverse sectional view.

Like numerals of reference designate corresponding parts in all the figures of the drawings.

1 designates a box or casing rectangular in section and provided at its front with ways 2, in which is arranged a vertically-movable door 3, located in advance of an opening or entrance 4 and adapted when the trigger mechanism is operated to fall by gravity and close the entrance, whereby the animal operating the trigger mechanism is confined within the box or casing. The vertically-movable door is provided at its top with a loop 6, attached to a connection 7, extending longitudinally of the trap to the trigger mechanism and consisting of front and rear flexible portions 7 and 8 and an intermediate wire or rod 9, which is provided for the purpose of preventing rats and other animals from gnawing and thereby breaking or otherwise injuring the connection. The front flexible portion 7 passes over a guide 10, consisting of a rod secured to extensions 11 of the ways and provided with a central bend for the reception of the connection 6. The rear flexible portion 8 extends through a perforation 12 of the top of the box or casing and is secured to a hook or catch which forms a part of the setting and tripping mechanism.

The setting and tripping mechanism consists of the hook or catch 13, a rod 14, hinged at one end and having its other end arranged to engage a treadle 15, and the latter constitutes the other part of the setting and tripping mechanism. The treadle 15, which is hinged at its rear or inner end, is bifurcated, as shown, and is provided with a lug or catch 16, arranged at the inner end of the rear bifurcation and adapted to engage the free end of the rod 14, whereby the catch or hook which engages the rod is anchored to set the trap. The catch or hook when in engagement with the rod 14 maintains the door 3 in an elevated position, and an animal attempting to obtain access to the bait will depress the treadle and trip the trap, and thereby close the door. The treadle is hinged to a block or support 17, which is provided with a recess, into which the treadle drops when it is depressed by the weight of the animal.

The track is provided at the back with a cage 18, forming a bait-receptacle and located in rear of the block or support to which the trigger is hinged, and this cage is formed by a longitudinal partition 19 and a vertically-movable swinging door 20, mounted in suitable ways 21 and adapted to be withdrawn through an opening of the top of the box or case. The partition 19, which extends along the trap near the center thereof, forms a run or passage located opposite the entrance-opening of the trap and adapted to direct an animal to the bait.

Either live or inanimate bait may be provided, and as it is arranged within the cage or bait-receptacle it is impossible for the captured animal to obtain access to it, and it does not have to be renewed.

The box or casing is provided at its top with a movable screen 22, mounted in transverse ways 23 and forming a light to illumine the interior of the trap, which may, if desired, be darkened by a board 24, adapted to be arranged over the screen, as illustrated in Figs. 2 and 3 of the accompanying drawings.

The screen is secured by a movable fastening device consisting of a pin 25, passing through a perforation of the top screen 22 and engaging a socket of the adjacent side wall of the box or casing. The ways 23 consist of strips secured to the top of the box or casing at opposite sides of a transverse opening and overhanging the same, and the board is adapted to be arranged between the strips. The strips project over the sides of the top screen and retain the same in place. When the fastening device is removed, the top screen may be readily withdrawn from the ways to afford access to the interior of the trap for setting or baiting the same. The captured animals may be conveniently emptied into a bag placed at the entrance of the trap. The screen-door of the cage is provided at its top with a handle to enable it to be readily withdrawn from the box or casing. The trap, which may be constructed either of wood or metal, is designed when constructed of wood to be reinforced at the door by hoop or sheet iron to protect it and prevent rats and other animals from gnawing out of the trap.

It will be seen that the trap is simple and comparatively inexpensive in construction, that it is exceedingly sensitive and positive and reliable in operation, and that it is adapted for capturing all kinds of animals attracted by live or inanimate bait.

Changes in the form, proportion, size, and the minor details of construction within the scope of the appended claims may be resorted to without departing from the spirit or sacrificing any of the advantages of this invention.

What is claimed is—

1. A trap comprising a box or casing having an entrance-opening, a vertically-movable door, a connection extending rearward from the door and passing downward through the top of the trap, a vertical catch depending from the rear end of the connection, a depressible treadle mounted within the box or casing, and a substantially horizontal rod hinged at one end and having its other end free and arranged to be engaged by the treadle, said rod engaging the catch at a point between its ends, substantially as and for the purpose described.

2. A trap comprising a box or casing having an entrance-opening, a longitudinal partition forming a passage or run, a sliding screen-door extending across the passage or run and forming a bait-receptacle, a vertically-movable door arranged at the entrance-opening, setting and tripping mechanism located within the box or casing, and connections between the door and the setting and tripping mechanism, substantially as described.

3. A trap comprising a casing provided with an entrance-opening and having an opening at its top and provided at opposite sides thereof with ways, a vertically-movable door arranged at the entrance-opening, setting and tripping mechanism located within the box or casing and connected with the door, a removable top screen mounted in the ways at the top opening, and a board or cover arranged over the screen and adapted to be removed, substantially as and for the purpose described.

In testimony that I claim the foregoing as my own I have hereto affixed my signature in the presence of two witnesses.

JOSHUA J. JOHNSON.

Witnesses:
J. K. P. BOWEN,
H. A. HOLLIDAY.